United States Patent
Chin et al.

(10) Patent No.: US 6,778,556 B1
(45) Date of Patent: *Aug. 17, 2004

(54) ASYMMETRICAL DATA RATES AND POWER IN WIRELESS DIGITAL COMMUNICATION

(75) Inventors: Raymond Chin, Los Altos, CA (US); Weijia Wang, Sunnyvale, CA (US); Arlin Torbett, Atherton, CA (US)

(73) Assignee: GWCOM, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1164 days.

(21) Appl. No.: 08/784,860

(22) Filed: Jan. 15, 1997

(51) Int. Cl.$^7$ .......................... H04B 17/00; H04Q 7/20
(52) U.S. Cl. ...................... 370/468; 37/522; 455/88; 455/426; 455/450
(58) Field of Search ................ 370/276, 280, 370/281, 294, 296, 337, 347, 465, 468, 522, 524, 295; 455/450, 451, 452, 524, 517, 426; 340/825.44, 870.11

(56) References Cited

U.S. PATENT DOCUMENTS

| | | | | |
|---|---|---|---|---|
| 4,968,966 A | * | 11/1990 | Jasinski et al. | 340/825.44 |
| 5,483,676 A | * | 1/1996 | Mahany et al. | 370/468 |
| 5,717,830 A | * | 2/1998 | Sigler et al. | 455/426 |
| 5,748,104 A | * | 5/1998 | Argyroudis et al. | 340/426 |
| 5,754,961 A | * | 5/1998 | Serizawa et al. | 370/468 |

FOREIGN PATENT DOCUMENTS

| EP | 000330222 | * | 8/1989 | 370/330 |
|---|---|---|---|---|

* cited by examiner

*Primary Examiner*—Chi Pham
*Assistant Examiner*—Afsar M Qureshi
(74) *Attorney, Agent, or Firm*—Edward C. Kwok; MacPherson Kwok Chen & Heid LLP

(57) ABSTRACT

A wireless communication network includes numerous mobile terminals and numerous transceivers ("base stations"). In this wireless communication network, messages sent from the base stations to the mobile terminals are transmitted at a higher data rate than the messages sent from the mobile terminals to the base stations. In one embodiment, a "half-duplex" protocol assigns separate times slots for base stations and mobile terminal transmissions. In another embodiment, a modified "full-duplex" protocol provides "half-duplex" operation in the mobile terminals and "full-duplex"operation in the base stations.

11 Claims, 3 Drawing Sheets

ASYMMETRICAL DATA RATES AND POWER IN WIRELESS DIGITAL COMMUNICATION

BACKGROUND OF THE INVENTION

1. Field of the Invention

The present invention relates to wireless communication. In particular, the present invention relates to wireless communication using low-power mobile terminals.

2. Discussion of the Related Art

In a "2-way paging" network, in addition to the messaging application, a user can be provided convenience access to information services, such as weather reports, traffic conditions, stock quotes, and even access to wide area data networks, such as the internet. In one such wireless communication network 100, shown in FIG. 1, transmitter 102 of a network control unit 104 broadcasts messages to mobile terminals (e.g. mobile units 101a–101c) in its service area. Each mobile unit, which is uniquely identified by an identification code, includes a receiver, a low-power transmitter, a display panel (e.g. 4-line liquid crystal display), and a simple keyboard. In wireless communication network 100, numerous receivers (e.g. 103a–103c) are distributed in the service area for receiving transmissions from the nearby mobile terminals, so as to minimize the power requirements of these mobile terminals. Receivers 103a–103c relays the received transmissions of the mobile units to network control unit. Power conservation in mobile terminals is important to achieve a reasonable service battery life before battery replacement or recharging is necessary. One disadvantage of this system is that, at any given time, only one message can be sent from the network control center. The latencies that can occur because of messages queuing at the network control center renders this wireless communication network unsuitable for transaction processing applications (e.g. fund transfers between bank accounts).

An improvement upon the above communication network is achieved by providing, instead of receivers 103a–103c, bidirectional base stations which are capable of communication locally with nearby mobile terminals. An example of a wireless communication network supporting bidirectional communication with local base stations is described in a copending patent application ("Copending Application"), entitled "Wireless Network Access Scheme" by Weijia Wang, Ser. No. 08/542,860, filed on Oct. 13, 1995, attorney. Copending Application is hereby incorporated by reference in its entirety to provide background information regarding such 2-way paging networks. In this system, because a mobile terminal communicates primarily with its closest base station, system capacity is much greater than the system illustrated is FIG. 1, owing to concurrent and non-interfering use of the spectrum by mobile terminals and base stations not within range of each other.

In general, the range of a transmitter increases with its power but decreases with its data rate. For example, if a given range can be covered by a half-watt transmitter transmitting at 800 baud, to allow transmitting at 9600 baud over the same range, the power requirement on the transmitter may rise to 5.5 watts. Because of the low-power requirement and the need to maintain a reasonable service range, mobile terminals in the prior art communicate at around 1200–2400 baud. To increase channel capacity, i.e. to provide a higher data rate, either the range of the mobile terminal must decrease or a higher power transmitter must be provided to the mobile terminals. If the range of the mobile terminal is decreased, the number of base stations necessary to service the mobile terminals in a given service area must be increased. To achieve a higher data rate, the cost of system hardware increases rapidly.

SUMMARY OF THE INVENTION

According to the present invention, a wireless communication network includes (a) a network control center; (b) numerous mobile terminals each receiving messages from the network control center at a first data rate and transmitting messages to the network control center at a second data rate, the first data rate being higher than the second data rate; and (c) numerous base stations coupled to the network control center for receiving messages from the mobile terminals and relaying the messages to the network control center. The base stations are also used to relay messages from the network control center to the mobile terminals. Under this wireless communication network, capacity of the network can be increased without requiring a shorter range, or a higher power transmission capability, in the mobile terminals.

In one embodiment of the wireless communication network, the mobile terminals transmit and receive messages at separate time slots, so that full-duplex circuits need not be provided in the mobile terminals. In another embodiment of the wireless communication network, full-duplex circuits are provided in the base stations to allow transmission and reception of messages simultaneously. In that embodiment of the wireless communication network, separate frequencies are used in transmission and reception of messages in the mobile stations. In one example, the transmission and reception frequencies are both approximately a predetermined carrier frequency, but separated by the intermediate frequency used to modulate the baseband signal.

The present invention is better understood upon consideration of the detailed description below and the accompanying drawings.

DETAILED DESCRIPTION OF THE PREFERRED EMBODIMENTS

The present invention provides a wireless communication network in which messages sent from the network control center to mobile terminals ("downlink") are transmitted at a higher data rate than messages sent from the mobile terminals to the network control center ("uplink"). The present invention increases network capacity without requiring a mobile terminal of the wireless communication network to have either a shorter range or a higher power transmitter. The inventor of the present application observes that uplink messages from a mobile terminal is usually much shorter than downlink transmissions from the network control center. For example, a request for a stock quote may have a message length of tens of bytes, including only such data as user identification information and a list of trading symbols. In return, the information service responding to the request may send a message having hundreds of bytes of data, reporting for each trading symbol, the trading volume, the present bid and ask prices, intra-day and historical high and low prices, opening and closing prices. Thus, in the present invention, because downlink messages to the mobile terminals from the network control center are sent at a higher data rate, while the uplink messages transmitted from the low-power mobile terminals to the network control center are sent at a lower data rate, system capacity is increased many folds over prior art system with equal downlink and uplink data rates, without increasing dramatically system hardware cost.

Figure 1:
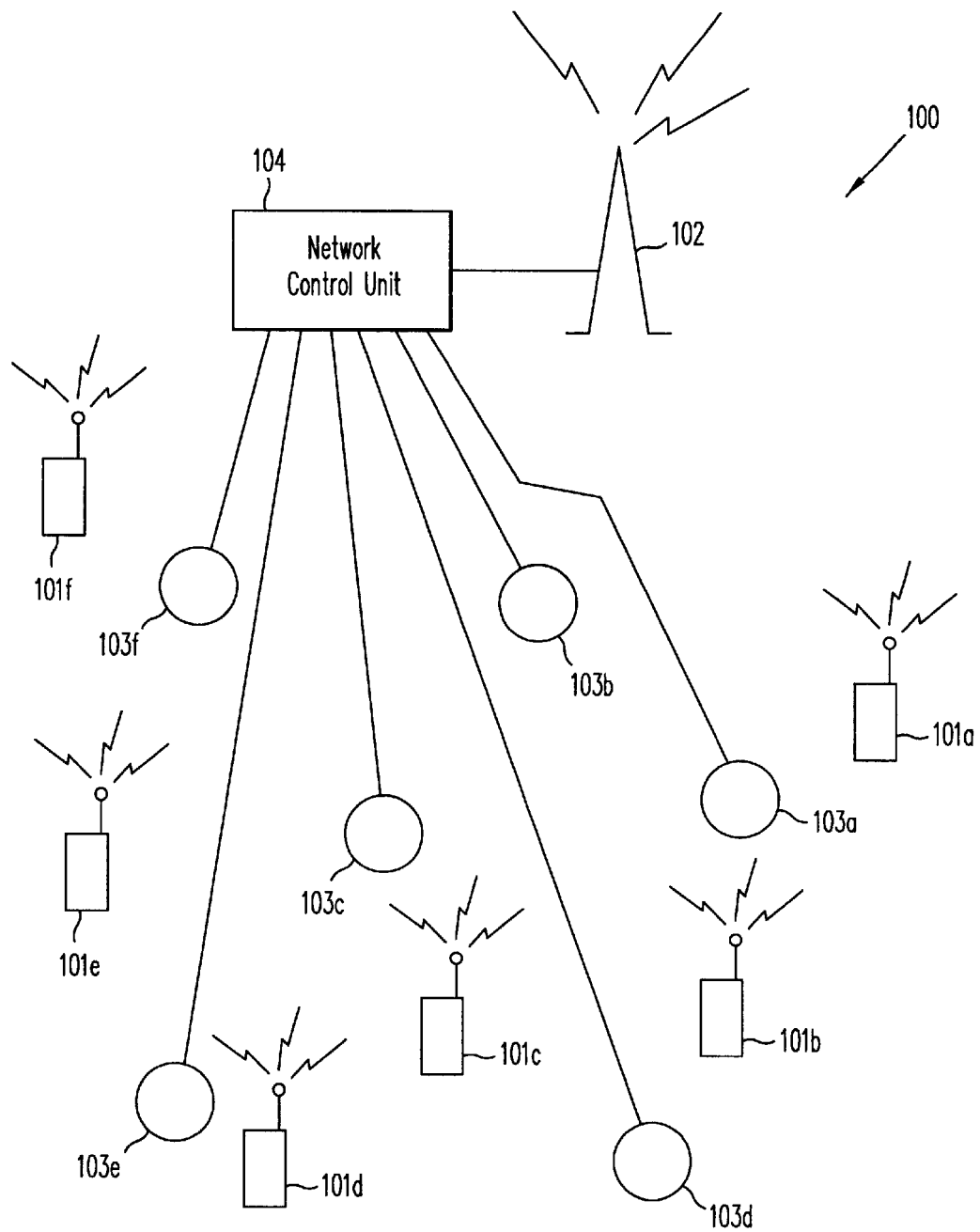
FIG. 1 shows a wireless communication network 100 in the prior art.
Figure 2:
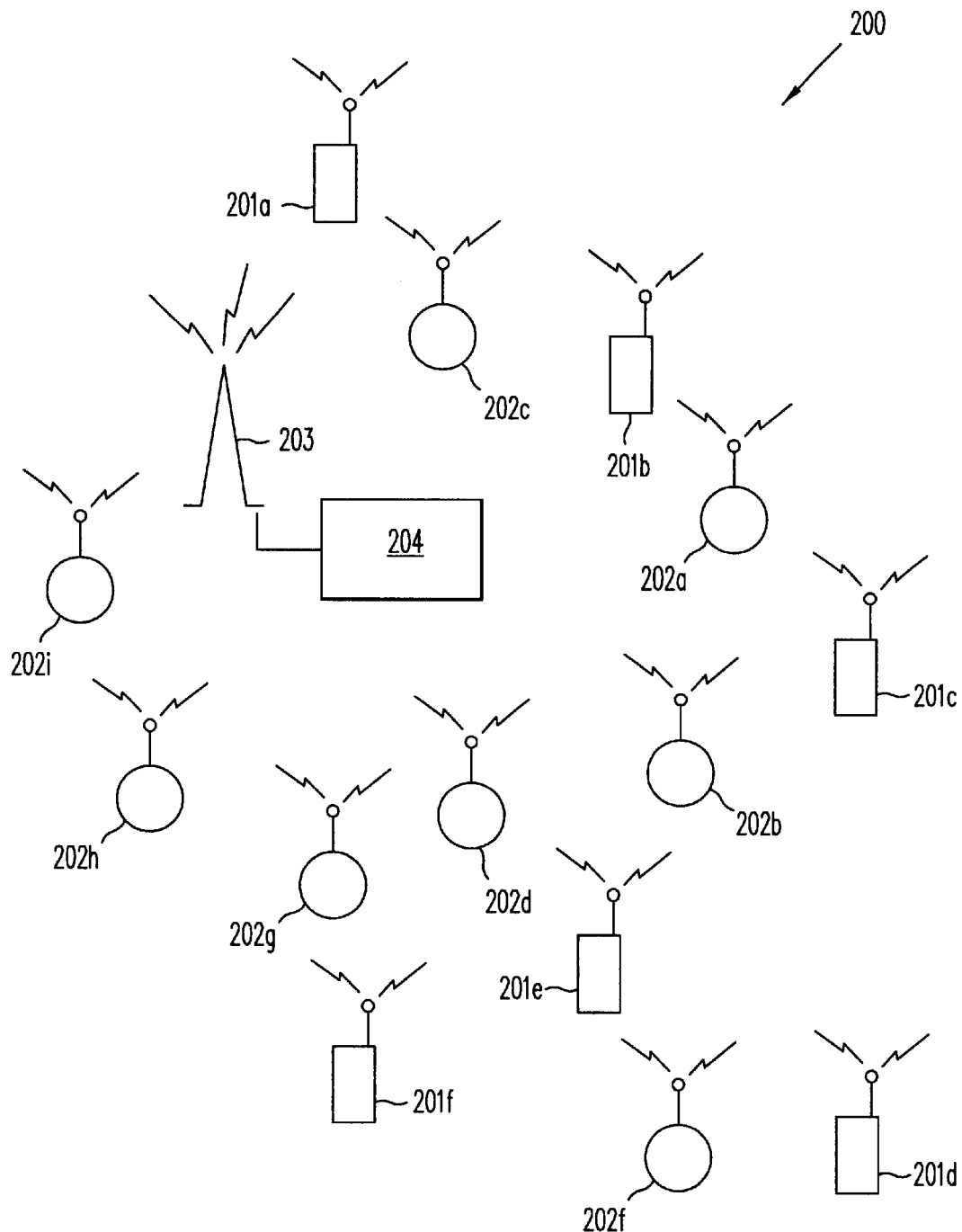
FIG. 2 shows a wireless communication network 200 in one embodiment of the present invention.

FIG. 2 shows a wireless communication network 200 in one embodiment of the present invention. In FIG. 2, wireless communication network 200 includes a number of mobile terminals, e.g. mobile terminals 201a–201f, and a number of base stations, e.g. base stations 202a–202i, within a service area. In addition, a high power transmitter 203 is used to deliver messages intended for mobile terminals in the service area whose proximity to a base station are not known or not yet known. In accordance with the present invention, the data rate for uplink messages transmitted from a mobile terminal to a base station remains at a lower data rate, e.g. 2400 baud, while downlink messages sent to the mobile terminal by transmitter 203 or base station 201a–201i are sent at a much higher data rate, e.g. 9600 baud. In one embodiment, an initial control message from a base station may be sent to a mobile terminal at a first data rate. This initial control message may specify to the mobile terminal a second data rate for reception and a third data rate for transmission. Neither the second data rate nor the third data rate need to be equal to each other or to the first data rate.

Figure 3A:
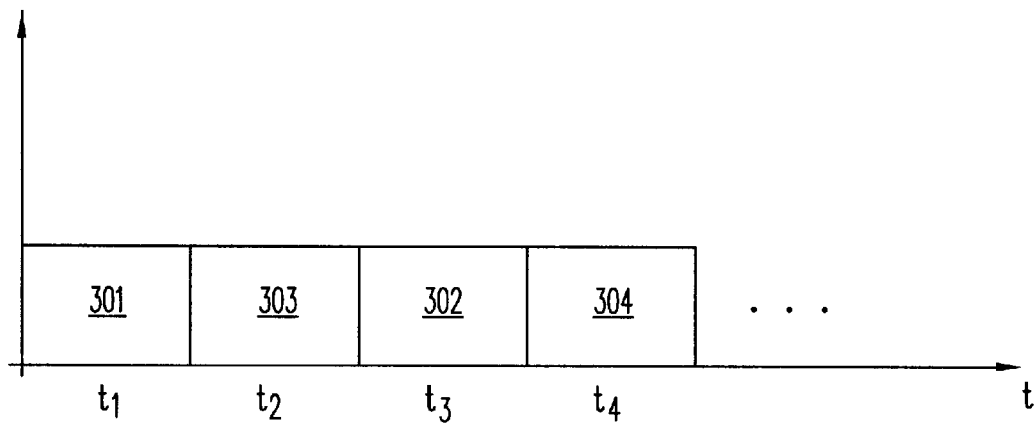
FIG. 3a shows a timing diagram for wireless communication network 200 under a "half-duplex" scheme.

Several protocols can be used in wireless communication network 200 to allow an orderly and efficient use of the available spectrum. For example, under a "half-duplex" scheme, i.e. a mobile terminal can send and receive messages, but not simultaneously. Under this scheme, the mobile terminal transmits and receives at slightly different frequencies which are so close as to result in interference if transmission and reception take place simultaneously. FIG. 3a shows a timing diagram for wireless communication network 200 under a "half-duplex" scheme. As shown in FIG. 3a, under the "half-duplex" scheme, time slots 301 and 302 are allocated for high data rate transmission to the mobile terminals and time slots 303 and 304 are allocated for the lower data rate transmission from mobile terminals. Transmitter 203 can broadcast a timing signal periodically to all mobile terminals in the service area, to synchronize the mobile terminals and the base stations. Clearly, system capacity can be increased in this instance by increasing the data rate during time slots 301 and 302. Such a modification requires neither increasing the power of the transmitter in the mobile terminals nor reducing the operational range of the mobile terminals.

Figure 3B:
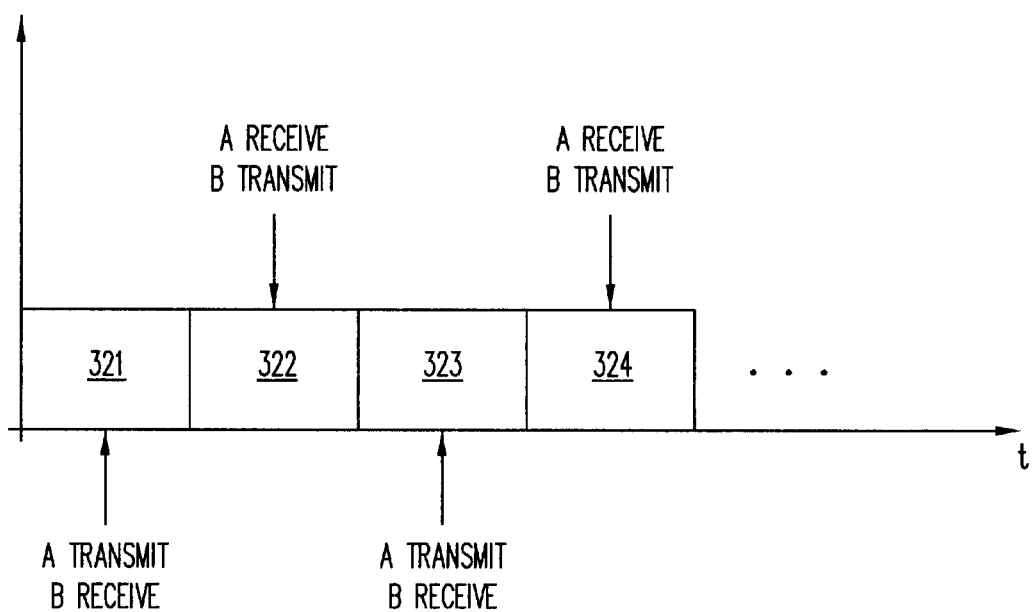
FIG. 3b shows a timing diagram for wireless communication network 200 under a modified "full-duplex" scheme.

Alternatively, a modified "full-duplex" protocol for the base stations can be used. Under this modified "full-duplex" protocol, mobile terminals can remain "half-duplex" to maintain a low-cost advantage, while base stations can receive and transmit at the same time. Under this protocol, separate non-interfering frequencies are used for transmitting and receiving messages, so that collisions between messages sent to the base stations and messages sent by the base stations are eliminated. Under this protocol, a base station can transmit a message to a mobile terminal on a first frequency while receiving a message from another mobile terminal on a second frequency. FIG. 3b illustrates this modified "full duplex" protocol. As shown in FIG. 3b, in time slots 321 and 323 a mobile terminal "A" transmits to a base station, and at time slots 322 and 324 mobile terminal "A" receives from the base station. At the same time, in time slots 322 and 324 a mobile terminal "B" transmits to a base station, and in time slots 321 and 323 terminal "B" receives from the base station. Thus, both mobile terminals "A" and "B" can remain "half-duplex", while the base stations are "full-duplex". Under this modified "full-duplex" protocol also, system capacity is increased without modifying the range or data rate of the mobile terminals.

Finally, to allow mobile terminals to transmit and receive at different data rates, different transmit and receive clock signals are provided in a mobile terminal. Such different transmit and receive clock signals can be provided, for example, by an oscillator generating a high frequency clock signal (i.e. a clock signal having a frequency higher or equal to the prescribed frequency of the receive clock signal) and dividing the high frequency clock signal down to the prescribed transmit and receive clock signals.

To allow a mobile terminal to receive and transmit at different frequencies, as required in the modified "full-duplex" protocol, the mobile terminal can be modified to receive at a slight offset (e.g. by the intermediate frequency used to modulate the mobile terminal's baseband signal) to its prescribed transmit carrier frequency. Such an arrangement minimizes cost of the mobile terminal by sharing the same oscillator between the transmit and receive circuits. The modifications discussed above for achieving separate transmit and receive data rates and separate transmit and receive carrier frequencies in a mobile terminal can be readily performed by those skilled in the art.

The above detailed description is provided to illustrate specific embodiments of the present invention and is not intended to be limiting. Numerous variations and modifications are possible within the scope of the invention set forth in the claims appended herewith.

We claim:

1. A wireless communication network supporting a plurality of mobile terminals each capable of receiving messages selectably at a first data rate and a second data rate, and transmitting messages at a third data rate, said first data rate being greater than both said second and third data rates, said network comprising:

a network control center; and a plurality of base stations coupled to said network control center, each base station being capable of receiving messages from said mobile terminals at said third data rate and relaying said messages to said network control center wherein, during communication between said base station and one of said mobile terminals, said base station sends said mobile terminal a control message at said second data rate, said control message specifying said first data rate for subsequent messages to said mobile terminal.

2. A wireless communication network as in claim 1, wherein said first data rate being greater said second data rate.

3. A wireless communication network as in claim 1, wherein each of said mobile terminals transmits and receives messages at separate time slots.

4. A wireless communication network as in claim 1, wherein each of said base stations transmits and receives messages simultaneously.

5. A wireless communication network as in claim 1, wherein said mobile terminals transmit messages at a first frequency and receive messages at a second frequency not interfering with said first frequency.

6. A wireless communication network as in claim 1, wherein said base stations relay messages from said network control center to be received at said mobile terminals.

7. A wireless communication network as in claim 1, wherein said base stations cover a plurality of substantially non-overlapping service areas.

8. A wireless communication network as in claim 7, further comprising a transmitter having a range covering two or more of said service areas.

9. A wireless communication network as in claim 8, wherein said transmitter is provided to allow said network control center to send to said mobile terminals paging messages.

10. A wireless communication network as in claim 1, wherein each base station communicates with said mobile terminals using a "half duplex" protocol.

11. A wireless communication network as in claim 1, wherein each base station communicates with said mobile terminals using a "full duplex" protocol.

* * * * *